US012374277B2

(12) United States Patent
Gharghi et al.

(10) Patent No.: US 12,374,277 B2
(45) Date of Patent: Jul. 29, 2025

(54) PULSE WIDTH MODULATION AND AMPLITUDE MODULATION DRIVING SYSTEM FOR DISPLAY PANELS

(71) Applicant: Apple Inc., Cupertino, CA (US)

(72) Inventors: Majid Gharghi, San Carlos, CA (US); Tore Nauta, Santa Cruz, CA (US); Saif Choudhary, San Jose, CA (US); Chuang Qian, Santa Clara, CA (US); Hopil Bae, Sunnyvale, CA (US); Mahdi Farrokh Baroughi, Santa Clara, CA (US); Xia Li, San Jose, CA (US); Patrick B Bennett, San Leandro, CA (US); Ze Yuan, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/742,756

(22) Filed: Jun. 13, 2024

(65) Prior Publication Data

US 2025/0022407 A1 Jan. 16, 2025

Related U.S. Application Data

(60) Provisional application No. 63/513,039, filed on Jul. 11, 2023.

(51) Int. Cl.
*G09G 3/32* (2016.01)

(52) U.S. Cl.
CPC ....... *G09G 3/32* (2013.01); *G09G 2300/0842* (2013.01); *G09G 2310/0259* (2013.01); *G09G 2310/066* (2013.01); *G09G 2310/08* (2013.01); *G09G 2330/021* (2013.01)

(58) Field of Classification Search
CPC ............. G09G 3/32; G09G 2300/0842; G09G 2310/0259; G09G 2310/08; G09G 2330/021; G09G 2310/066; G09G 3/2014
See application file for complete search history.

(56) References Cited

U.S. PATENT DOCUMENTS

| | | | | |
|---|---|---|---|---|
| 8,159,424 | B2 | 4/2012 | Yamamoto et al. | |
| 10,395,594 | B1 | 8/2019 | Charisoulis et al. | |
| 2005/0225519 | A1 * | 10/2005 | Naugler, Jr. | G09G 3/3291 345/77 |
| 2018/0190747 | A1 | 7/2018 | Son et al. | |
| 2018/0247586 | A1 | 8/2018 | Vahid Far et al. | |

(Continued)

FOREIGN PATENT DOCUMENTS

| | | | |
|---|---|---|---|
| EP | 3343551 | A1 | 7/2018 |
| JP | 2007122080 | A | 5/2007 |

*Primary Examiner* — Muhammad N Edun
(74) *Attorney, Agent, or Firm* — Aikin & Gallant, LLP

(57) ABSTRACT

A pulse width modulation and amplitude modulation driving system for a display panel, including related circuits and methods of operation, are described. In an embodiment, a display panel includes a thin film transistor layer comprising a plurality of subpixel circuits. Each subpixel circuit may include a drive transistor, a comparator, and a switch. A plurality of light emitting diodes (LEDs), such as micro-LEDs, may be connected to the plurality of subpixel circuits. Each subpixel circuit can control an LED based on a current amplitude controlled by the drive transistor and a current pulse width controlled by the comparator and the switch. Other aspects are also described and claimed.

18 Claims, 10 Drawing Sheets

(56) References Cited

U.S. PATENT DOCUMENTS

| | | | | |
|---|---|---|---|---|
| 2021/0272510 | A1 | 9/2021 | Huitema et al. | |
| 2022/0036821 | A1* | 2/2022 | Cong | G09G 3/3233 |
| 2022/0208066 | A1* | 6/2022 | Kikuchi | G09G 3/2007 |

* cited by examiner

PULSE WIDTH MODULATION AND AMPLITUDE MODULATION DRIVING SYSTEM FOR DISPLAY PANELS

RELATED APPLICATIONS

This patent application claims the benefit of priority of U.S. Provisional Application No. 63/513,039, filed Jul. 11, 2023, which is incorporated herein by reference in its entirety.

BACKGROUND

Field

Embodiments described herein relate to a display system, and more particularly to a pulse width modulation and amplitude modulation driving system for display panels.

Background Information

Display panels are utilized in a wide range of electronic devices. Common types of display panels include active matrix display panels where each pixel element, e.g., light emitting diode (LED), may be individually driven to display a data frame, and passive matrix display panels where rows and columns of pixel elements may be driven in a data frame. Frame rate can be tied to display artifacts and may be set at a specified level based on display application.

Conventional organic light emitting diode (OLED), or liquid crystal display (LCD) technologies, feature a thin film transistor (TFT) substrate. More recently, it has been proposed to integrate an array of inorganic III-V or II-VI semiconductor-based micro-LEDs as the emissive pixel elements within a display panel.

SUMMARY

A driving system for a display panel including micro-LEDs may utilize a combination of pulse width modulation and amplitude modulation. Some implementations may include a display panel including a TFT layer including a plurality of subpixel circuits. Each subpixel circuit of the plurality of subpixel circuits may include a drive transistor, a comparator, and a switch. A plurality of LEDs may be connected to the plurality of subpixel circuits. Each subpixel circuit can control an LED of the plurality of LEDs based on a current amplitude controlled by the drive transistor and a current pulse width controlled by the comparator and the switch.

In some implementations, each subpixel circuit receives a voltage ramp setting applied to a first input of the comparator, and a voltage data setting applied to a second input of the comparator, to control the current pulse width via the switch. In some implementations, each subpixel circuit includes a storage device connected to the drive transistor and the comparator to store the voltage data setting. In some implementations, each subpixel circuit includes a first storage device connected to the drive transistor and second storage device connected to the comparator, the first storage device storing the voltage data setting and the second storage device storing the voltage ramp setting. In some implementations, the voltage data setting is applied to a gate of the drive transistor to control the current amplitude. In some implementations, each subpixel circuit receives a second voltage data setting applied to a gate of the drive transistor to control the current amplitude. In some implementations, each subpixel circuit receives a global voltage reference applied to a gate of the drive transistor to control the current amplitude. In some implementations, the voltage ramp setting is constant between first and second frames while the voltage data setting changes to modulate the current pulse width. In some implementations, the plurality of subpixel circuits receives a global voltage ramp setting utilized by each subpixel circuit to control the current pulse width. In some implementations, the plurality of subpixel circuits receives a first voltage ramp setting and a second voltage ramp setting, the first voltage ramp setting utilized by a first group of subpixel circuit to control the current pulse width, and the second voltage ramp setting utilized by a second group of subpixel circuit to control the current pulse width. In some implementations, the drive transistor is connected to a power supply to control the current amplitude. In some implementations, the drive transistor is connected in series with the switch. In some implementations, an output of the comparator is connected to a gate of the switch. In some implementations, the plurality of LEDs is a plurality of micro-LEDs.

Some implementations may include a method of display, including generating a voltage ramp setting and a voltage data setting; and controlling, by a subpixel circuit of a plurality of subpixel circuits in a TFT layer, an LED of a plurality of LEDs. The subpixel circuit may include a drive transistor to control a current amplitude to the LED and a comparator to compare the voltage ramp setting and the voltage data setting to control a current pulse width to the LED. In some implementations, the method may further include accessing one or more look up tables to determine the voltage ramp setting and the voltage data setting. In some implementations, controlling the LED includes simultaneously controlling the current amplitude and the current pulse width. In some implementations, the voltage ramp setting is a global voltage ramp setting utilized by the plurality of subpixel circuits. In some implementations, the voltage ramp setting is a first voltage ramp setting of a plurality of voltage ramp settings utilized by the plurality of subpixel circuits. In some implementations, the plurality of LEDs is a plurality of micro-LEDs. Other aspects are also described and claimed.

DETAILED DESCRIPTION

Figure 1:
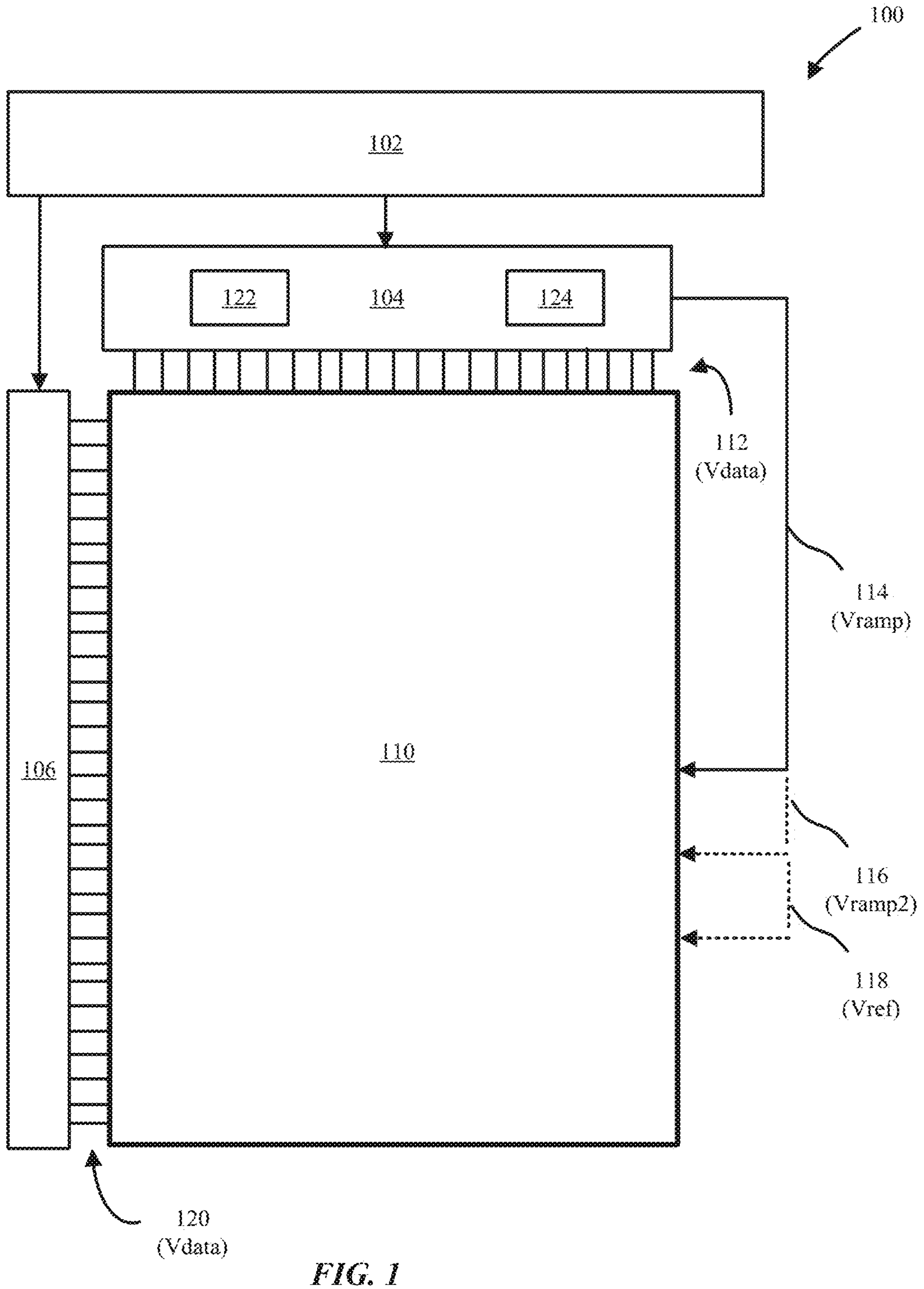
FIG. 1 is a generalized circuit diagram of a display system in accordance with an embodiment.

A driving system for displays (e.g., micro-LEDs) may include circuitry to simultaneously implement current pulse width modulation (e.g., time of emission) and current amplitude modulation. This may enable achieving a display gamma over a wide range of brightness bands for a wide range of portable electronic devices, including mobile telephones and wearable devices. In an embodiment, a display panel may include a TFT layer including a plurality of subpixel circuits. Each subpixel circuit of the plurality of subpixel circuits may include a drive transistor, a comparator, and a switch. The subpixel circuit can control an LED of a plurality of LEDs in the display based on a current amplitude controlled by the drive transistor and a current pulse width controlled by the comparator and the switch. Such an arrangement can maximize the effectiveness of current used to illuminate the LEDs, including micro-LEDs, resulting in a greater dynamic range and brightness of the display and/or reduced power consumption. The circuit designs in accordance with embodiments can be arranged with only p-channel metal-oxide-semiconductor (PMOS) transistors or complementary metal-oxide-semiconductor (CMOS) transistors including both PMOS and n-channel metal-oxide-semiconductor (NMOS). The transistors may be formed using suitable techniques such as amorphous silicon (a-Si) TFTs, low temperature poly silicon (LTPS) TFTs, oxide TFTs, and hybrid silicon TFT and oxide TFT structures.

In one aspect it has been observed that a combination of pulse width modulation and amplitude modulation may be advantageous for micro-LEDs based on their sensitivity to current (e.g., as opposed to OLED). While OLED illumination is generally scalable with current input for amplitude modulation it has been observed that micro-LEDs do not share the same responsiveness as OLEDs and can have significantly different efficiencies over different current densities. In accordance with embodiments, the term "micro-LED" as used herein may refer to the descriptive size, e.g. length or width, of the LED. In some embodiments, "micro-LEDs" may be on the scale of 0.1 μm to approximately 100 μm or less in many applications. More specifically, in some embodiments, "micro-LEDs" may be on the scale of 0.1 μm to 20 μm, such as 10 μm, 5 μm, 3 μm, or 1 μm where the LED lateral dimensions approach or surpass the carrier diffusion length. Embodiments disclosed herein enable limiting current amplitude within a defined range that is beneficial for micro-LEDs (e.g., between $1\times10^{-8}$ and $1\times10^{-5}$ Amperes, to reduce issues associated with system reliability and/or current droop), while achieving a greater dynamic range and/or power reduction, based on simultaneously implementing a current pulse width modulation and a current amplitude modulation. Adding the current pulse width modulation to the limited current range may enable expanding the dynamic range for the micro-LED display.

Embodiments describe a pulse width modulation and amplitude modulation driving system for display panels. In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

FIG. 1 is a generalized circuit diagram of a display system 100 in accordance with an embodiment. The display system 100 may include a control circuit 102, a display driver 104, gate drivers 106, and a display panel 110. In various implementations, the control circuit 102 may control the display driver 104 and the gate drivers 106 to display a plurality of frames to the display panel 110 (e.g., video at 60 Hz or 120 Hz). The display panel 110 may include a plurality of LEDs, such as micro-LEDs. The display panel 110 may also include a TFT layer (which may include multiple layers) including a plurality of subpixel circuits connected to the plurality of LEDs. The TFT layer can provide a sample-and-hold and current source capability per subpixel. As a result, the plurality of subpixel circuits may actively drive the plurality of LEDs to display the frames in the display panel 110. For example, a subpixel circuit of the plurality of subpixel circuits can actively drive an LED of the plurality of LEDs.

The display driver 104 may be coupled to the display panel 110 to supply video control signals to the subpixel circuits (e.g., vertically to the columns). The video control signals may include a plurality of video data lines 112 supplied to columns of subpixel circuits (e.g., dedicated lines wired to columns of the subpixel circuits). Each video data line 112 may supply a voltage data setting (Vdata) to a column. The voltage data setting may provide a first level of programming for an LED driven by a subpixel circuit. The video control signals may also include a voltage ramp data line 114 supplied to the subpixel circuits (e.g., a dedicated line wired to each of the subpixel circuits). The voltage ramp data line 114 may supply a voltage ramp setting (Vramp) to the subpixel circuits, including in different rows and columns. The voltage ramp setting may provide a second level of programming for an LED driven by a subpixel circuit. The plurality of voltage data settings and the voltage ramp setting may enable the subpixel circuits to control the plurality of LEDs based on a combination of pulse width modulation and amplitude modulation.

Figure 4:
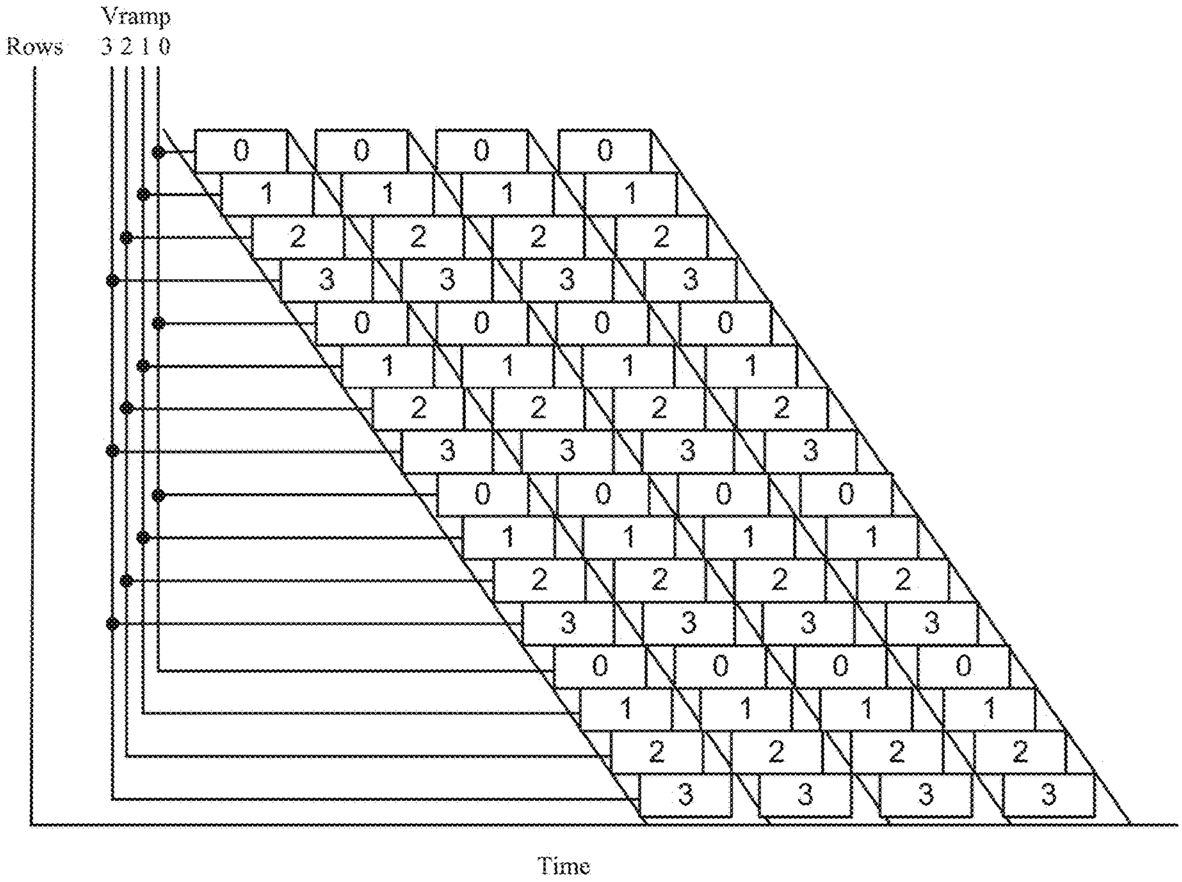
FIG. 4 is a diagram of an example of voltage ramp settings applied in phases.

In some implementations, the voltage ramp setting may be a global voltage ramp setting utilized by each subpixel circuit to control the current pulse width. In some implementations, the video control signals may include a plurality of voltage ramp data lines to supply a plurality of voltage ramp settings, including as described in FIG. 4. For example, in addition to the voltage ramp data line 114 supplying the voltage ramp setting, the video control signals may also include a second ramp data line 116 to supply a second voltage ramp setting (Vramp2). The display driver 104 may distribute the plurality of voltage ramp data lines to different groups of subpixel circuits in the display panel 110. For example, the voltage ramp data line 114 could supply the voltage ramp setting to an upper half of subpixel circuits in the display panel 110 in a first group (e.g., upper rows), and the second ramp data line 116 could supply the second voltage ramp setting to a lower half of subpixel circuits in the display panel 110 in a second group (e.g., lower rows). The plurality of voltage data settings and the plurality of voltage ramp settings may enable the subpixel circuits to control the plurality of LEDs, in different phases, based on a combination of pulse width modulation and amplitude modulation.

In some implementations, the video control signals may include a voltage reference line 118 supplied to the subpixel circuits. The voltage reference line 118 may supply a global voltage reference (Vref) to the subpixel circuits, including in different rows and columns. The global voltage reference may provide another level of programming for an LED driven by a subpixel circuit. For example, the plurality of voltage data settings, the voltage ramp setting, and the global voltage reference may enable the subpixel circuits to control the plurality of LEDs based on a combination of pulse width modulation and amplitude modulation.

The display driver 104 may also supply a power grid to the display panel 110. The power grid may include high voltage power supply lines and low voltage power supply lines supplied to the subpixel circuits. The high voltage power supply lines can provide a current that subpixel circuits can pulse width modulate, and amplitude modulate, in different ways when powering the plurality of LEDs. In some implementations, the display driver 104 can be placed on a chip on film or a flex circuit.

The gate drivers 106 may be coupled to the display panel 110 to supply row control signals to the subpixel circuits (e.g., horizontally to the rows). For example, the gate drivers 106 may include switches or transistors providing scan lines 120 to rows of subpixel circuits (e.g., dedicated lines wired to rows of the subpixel circuits). In some implementations, the gate drivers 106 can be placed on a chip on film or a flex circuit.

The control circuit 102 can include a timing controller (TCON) to coordinate the display driver 104 and the gate drivers 106 to display frames to the display panel 110. The control circuit 102 may also include additional system components coupled with the display driver 104, the gate drivers 106, and/or directly to the display panel 110. For example, the control circuit 102 can include a host system on chip (SoC), a power management integrated circuit (PMIC), level shifters, a touch screen controller, and/or additional passive circuitry.

In some implementations, the display driver 104 may implement one or more look up tables, such as a first look up table 122 and a second look up table 124. For example, the look up tables may indicate digital gray level values, which could range from 0 to 255. The display driver 104 may reference the look up tables to determine programming (e.g., for the plurality of LEDs) to achieve varying levels of brightness in the display panel 110. For example, to achieve a particular brightness, the display driver 104 can access the first look up table 122 to determine voltage data settings and/or the second look up table 124 to determine voltage ramp settings, then utilize digital to analog converters to supply the voltage data settings and the voltage ramp settings to the subpixel circuits.

Figure 2:
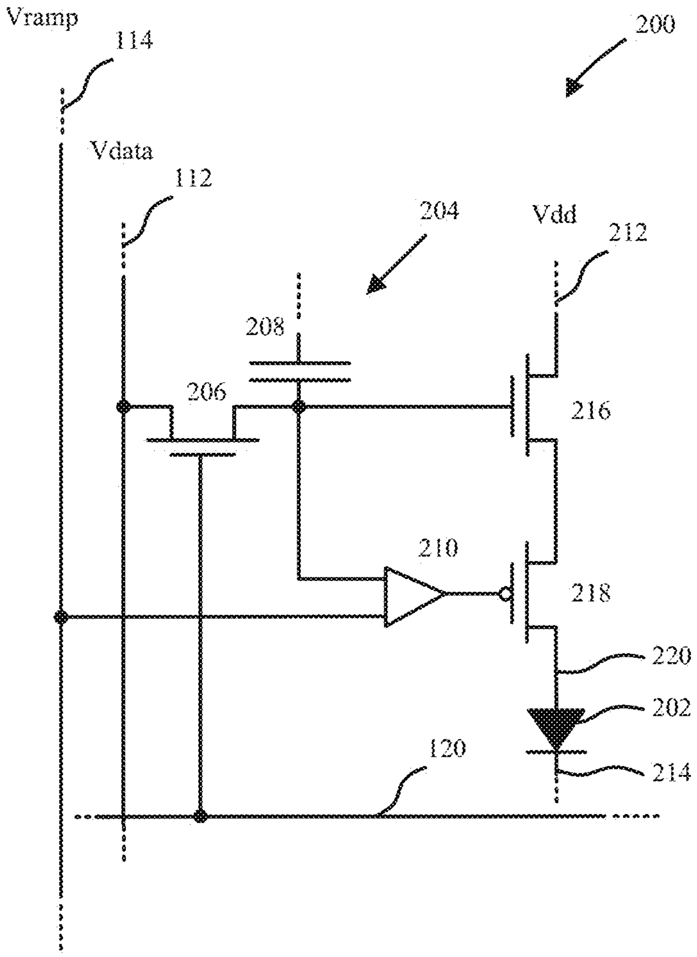
FIG. 2 is a generalized circuit diagram of a subpixel circuit in accordance with an embodiment.

FIG. 2 is a generalized circuit diagram of a subpixel circuit 200 in accordance with an embodiment. The subpixel circuit 200 could be implemented in the display panel 110. For example, the TFT layer including the plurality of subpixel circuits of the display panel 110 may comprise subpixel circuits like the subpixel circuit 200.

The subpixel circuit 200 may receive from the display driver 104 a video data line 112 supplying a voltage data setting (Vdata). The subpixel circuit 200 may also receive from the display driver 104 a voltage ramp data line 114 supplying a voltage ramp setting (Vramp). The subpixel circuit 200 may also receive from a gate driver of the gate drivers 106 a scan line 120. The video data line 112 may be coupled with a plurality of (rows) subpixel circuits 200 implemented by the display panel 110. The scan line 120 may be coupled with a plurality of (columns) subpixel circuits 200 implemented by the display panel 110. Thus, the display panel 110 may include a plurality of columns of video data lines 112, and a plurality of rows of scan lines 120. As described herein, the voltage data setting and the voltage ramp setting may enable the subpixel circuit 200 to control an LED 202 based on a combination of pulse width modulation and amplitude modulation. For example, the LED 202 may be one of a plurality of LEDs implemented by the display panel 110.

As shown in the circuit diagram, the subpixel circuit 200 can include a memory cell 204 coupled with the video data line 112, from the display driver 104, and the scan line 120 from the gate driver. In an embodiment, the memory cell 204 may include a select switch 206, such as a thin film transistor, and a storage device 208, such as a capacitor. The video data line 112 may supply the voltage data setting to the storage device 208. The select switch 206 may enable programming of the voltage data setting to the storage device 208.

The subpixel circuit 200 can further include a comparator 210. The comparator 210 may comprise circuitry, such as thin film transistors, configured to receive first and second inputs and generate an output based on a comparison between the two inputs. The comparator 210 may be coupled with the voltage ramp data line 114 to receive the voltage ramp setting at the first input. The comparator 210 may also be coupled with the memory cell 204 (e.g., the storage device 208) to receive the voltage data setting at the second input. The comparator 210 may compare the voltage ramp setting to the voltage data setting to generate the output.

In some implementations, the display panel 110 can include an array of pixel driver chips, with each pixel driver chip including one or more of the subpixel circuits 200. The pixel driver chips may additionally include functionality from the gate drivers 106 and/or display driver 104. The pixel driver chips may also be present with the TFT layer. For example, the pixel driver chips can be mounted onto the TFT layer, or alternatively the TFT layer formed on the pixel driver chips. In some implementations, the subpixel circuits 200 can be partially formed in the TFT layer and partially formed in the pixel driver chips. For example, the memory cell 204 and/or the comparator 210 could be part of a pixel driver chip that can switch and drive a corresponding plurality of LEDs, such as a matrix of LEDs which could be micro-LEDs. Such a configuration may provide additional area for global routing lines (Vramp, Vdata, Vref, Vdd, etc.).

Still referring to FIG. 2, the subpixel circuit 200 may receive a high voltage power supply line 212 (e.g., Vdd) and low voltage power supply line 214 (e.g., Vss). The high voltage power supply line 212 may be connected to a first source/drain terminal of a drive transistor 216 (e.g., a transistor, such as a MOSFET which could be an NMOS transistor, which may be in the TFT layer). A gate of the drive transistor 216 may be connected to the memory cell 204 (e.g., the storage device 208). The memory cell 204 and the drive transistor 216 may comprise an amplitude modulator of the subpixel circuit 200 (e.g., a TFT current source).

Further, a second source/drain terminal of the drive transistor 216 may be connected to a first source/drain terminal of a switch 218 (e.g., another transistor, such as another MOSFET which could be a PMOS transistor, which may be in the TFT layer). A gate of the switch 218 may be connected to the output of the comparator 210. The comparator 210 and the switch 218 may comprise a pulse width modulator of the subpixel circuit 200 (e.g., a TFT emission source). A second source/drain terminal of the switch 218 may be connected with the LED 202. Thus, the amplitude modulator (e.g., including the drive transistor 216) and the pulse width modulator (e.g., including the switch 218) of the subpixel circuit 200 may be in series with the LED 202. In embodiments, the amplitude modulator (e.g., via the drive transistor 216) can be utilized to control amplitude modulation of current, while the pulse width modulator (e.g., via the comparator 210 and the switch 218) can be utilized to control pulse width modulation of the current, to the LED 202.

In operation, the subpixel circuit 200 can apply the voltage ramp setting and the voltage data setting, from the display driver 104, to control the LED 202. The subpixel circuit 200 can control the LED 202 based on a combination of pulse width modulation and amplitude modulation. The subpixel circuit 200 can apply, via the storage device 208 and the drive transistor 216, the voltage data setting (e.g., from the video data line 112) to control a current amplitude to the LED 202. Additionally, the subpixel circuit 200 can apply, via the comparator 210 and the switch 218, the voltage data setting (e.g., from the video data line 112) and the voltage ramp setting (e.g., from the voltage ramp data line 114) to control a current pulse width (e.g., a time of emission) to the LED 202. The combination of pulse width modulation and amplitude modulation may cause a simultaneous change in current pulse width and current amplitude, respectively, at an emission 220 supplied to the LED 202.

Thus, a voltage data setting may be loaded to the subpixel circuit 200 per frame of display to determine a current amplitude modulation. The same voltage data setting, combined with the voltage ramp setting, may determine the time of emission to the LED 202. As a result of the combination, the subpixel circuit 200 can improve control of light emitted by the LED 202 to provide a greater dynamic range and/or a reduced power consumption, including for a display panel comprising micro-LEDs.

Figure 3:
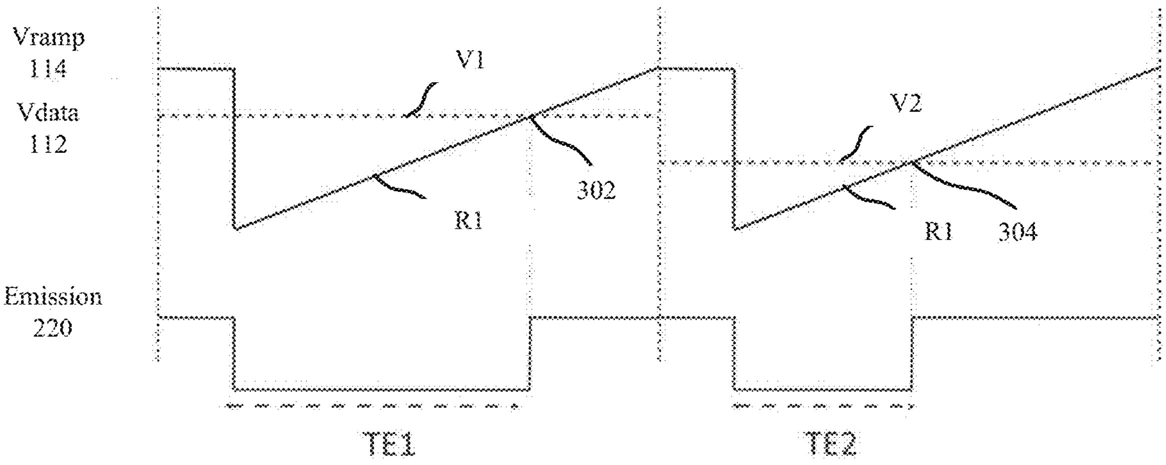
FIG. 3 is a diagram of an example of a voltage ramp setting and a voltage data setting.

For example, with additional reference to FIG. 3, to generate a first time of emission (e.g., TE1, which could correspond to a first frame), the subpixel circuit 200 may receive a first voltage data setting V1 (e.g., via the video data line 112) and a voltage ramp setting R1 (e.g., via the voltage ramp data line 114). The first voltage data setting V1 may be applied to the gate of the drive transistor 216 at a first time to configure a first current amplitude. Additionally, the first voltage data setting V1 and the voltage ramp setting R1 may be applied as inputs to the comparator 210 to cause a first output of the comparator 210. The first output may be applied to the gate of the switch 218 at the first time to configure a first current pulse width. For example, the first output may cause the switch 218 to activate when the first voltage data setting V1 exceeds the voltage ramp setting R1, such as before an intersection point 302 between the first voltage data setting V1 and the voltage ramp setting R1 (e.g., the switch 218 being a PMOS device). A combination of the first current amplitude and the first current pulse width may result in the first time of emission to the LED 202.

Still referring to FIG. 3, to generate a second time of emission (e.g., TE2, which could correspond to a second frame), the subpixel circuit 200 may receive a second voltage data setting V2 (e.g., via the video data line 112) and a voltage ramp setting R1 (e.g., via the voltage ramp data line 114). The second voltage data setting V2 may be applied to the gate of the drive transistor 216 at a second time to configure a second current amplitude. Additionally, the second voltage data setting V2 and the voltage ramp setting R1 may be applied as inputs to the comparator 210 to cause a second output of the comparator 210. The second output may be applied to the gate of the switch 218 at the second time to configure a second current pulse width. For example, the second output may cause the switch 218 to activate when the second voltage data setting V2 exceeds the voltage ramp setting R1, such as before an intersection point 304 between the second voltage data setting V2 and the voltage ramp setting R1. A combination of the second current amplitude and the second current pulse width may result in the second time of emission to the LED 202.

In this example, the voltage ramp setting R1 may be constant while the voltage data setting changes from frame to frame (e.g., from the first voltage data setting V1 to the second voltage data setting V2). The difference in the voltage data settings intersecting with a same voltage ramp setting causes a difference in times of emission (e.g., between TE1 and TE2). This enables a precise application of both amplitude modulation and pulse width modulation to the LED 202 while keeping the voltage ramp setting constant. In some implementations, the voltage data setting may be constant while the voltage ramp setting changes from frame to frame (e.g., from a first voltage ramp setting R1 to a second voltage ramp setting R2). In some implementations, the voltage data setting and the voltage ramp setting may both change from frame to frame (e.g., from a first voltage data setting V1 and a first voltage ramp setting R1, to a second voltage data setting V2 and a second voltage ramp setting R2). Such variations are within the scope of the embodiments.

In some cases, a plurality of voltage ramp settings (e.g., the voltage ramp setting from the voltage ramp data line 114, and a second voltage ramp setting (Vramp2) from a second ramp data line 116) may be supplied in phases to different subpixel circuits like the subpixel circuits 200. This may enable generating more accurate times of emission in pixels of the display panel 110, such as in a block of the display panel 110 (e.g., upper rows of subpixel circuits, or lower rows of subpixel circuits). For example, with additional reference to FIG. 4, the display driver 104 can supply a plurality of voltage ramp settings (e.g., Vramp0, Vramp1, Vramp2, and Vramp3) in phases for pixels in different rows and/or blocks at different times. For example, a first row of subpixel circuits 200 may receive voltage ramp setting 0, then a second row of subpixel circuits 200 can receive voltage ramp setting 1, then a third row of subpixel circuits 200 can receive voltage ramp setting 2, and so forth, in a staggered arrangement. The display driver 104 may synchronize the plurality of voltage ramp settings based on one or more conditions, such as rise times, fall times, and/or propagation delays of the voltage ramp settings. This may enable more accurate current amplitudes and pulse widths in different areas of the display panel 110.

Figure 5:
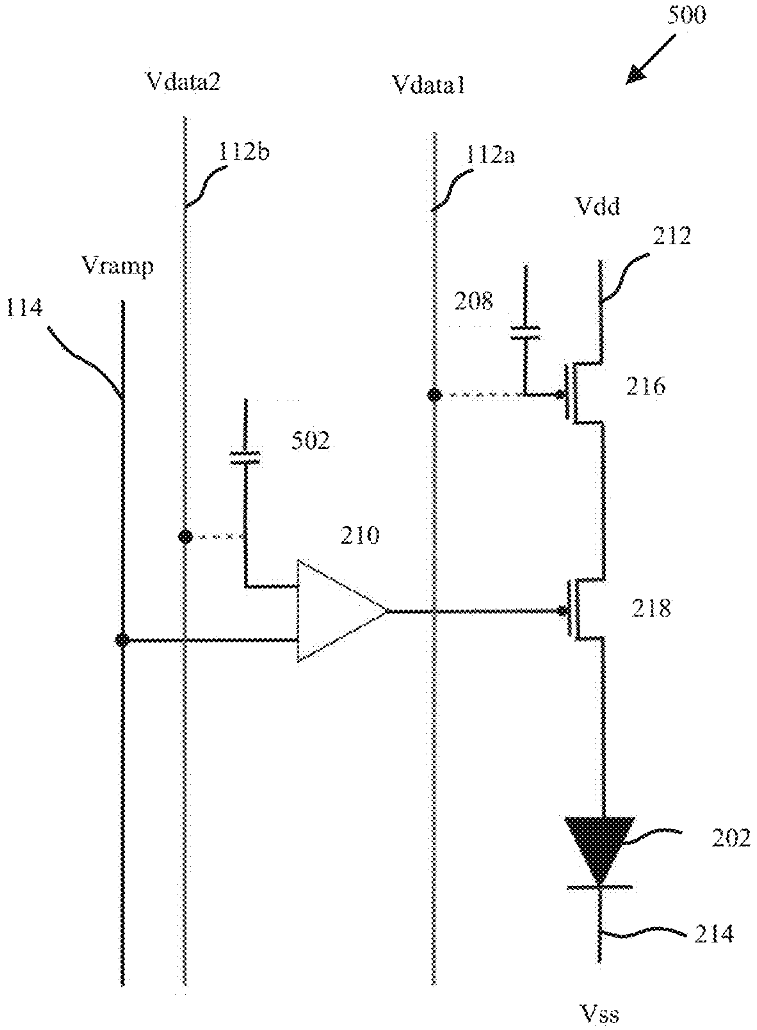
FIG. 5 is a generalized circuit diagram of a subpixel circuit in accordance with another embodiment.

FIG. 5 is a circuit diagram of a subpixel circuit 500 in accordance with another embodiment. For example, the subpixel circuit 500 could be used in place of, and/or in combination with, one or more structures of the subpixel circuit 200. The subpixel circuit 500 could be implemented in the display panel 110. For example, the TFT layer comprising the plurality of subpixel circuits of the display panel 110 may comprise subpixel circuits like the subpixel circuit 500.

The subpixel circuit 500 can include the storage device 208, the drive transistor 216, the comparator 210, and the switch 218 of FIG. 2, and a second storage device 502, such as another capacitor. A first the video data line 112*a* (e.g., like the video data line 112) may provide a first voltage data setting (e.g., Vdata1) which may be stored in the storage device 208. Additionally, a second video data line 112*b* may provide a second voltage data setting (e.g., Vdata2) which may be stored in the second storage device 502. The voltage ramp data line 114 may connect to a first input of the comparator 210, and the second storage device 502 may connect to a second input of the comparator 210.

In operation, the subpixel circuit 500 can apply, via the storage device 208 and the drive transistor 216, the first voltage data setting to control a current amplitude supplied to the LED 202. Additionally, the subpixel circuit 500 can apply, via the second storage device 502, the comparator 210, and the switch 218, the second voltage data setting and the voltage ramp setting to control a current pulse width modulation supplied to the LED 202. Supplying the first voltage data setting and the second voltage data setting, in addition to the voltage ramp setting, may enable the subpixel circuit 500 to control the LED 202 through a greater dynamic range.

Figure 6:
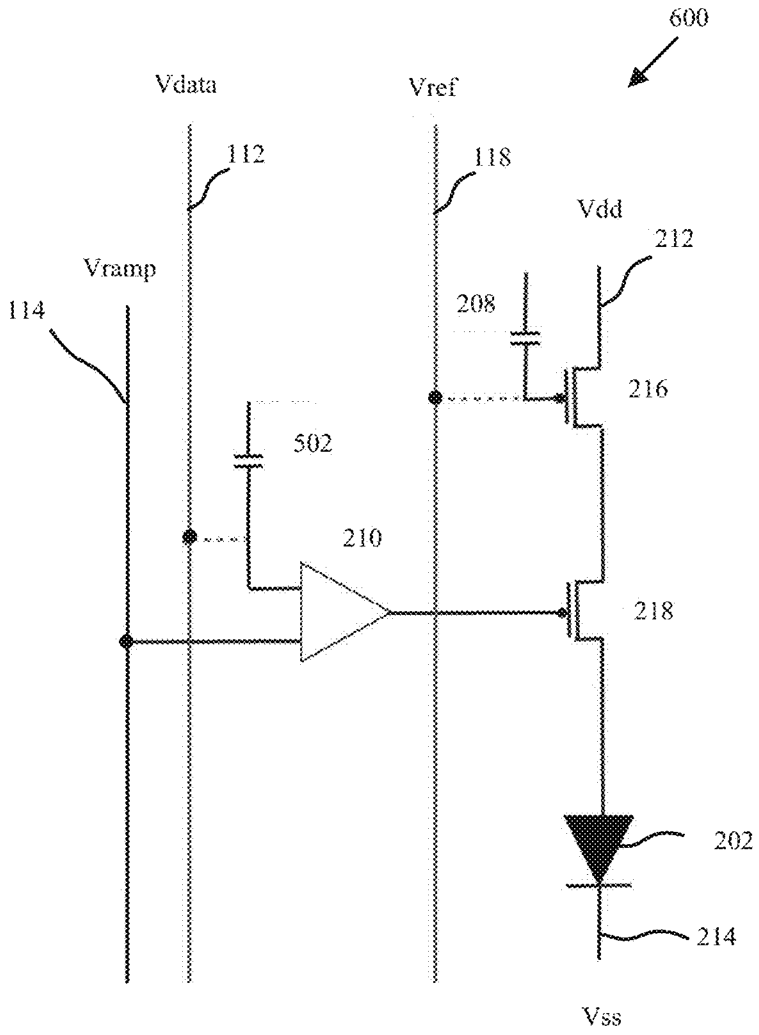
FIG. 6 is a generalized circuit diagram of a subpixel circuit in accordance with another embodiment.

FIG. 6 is a circuit diagram of a subpixel circuit 600 in accordance with another embodiment. For example, the subpixel circuit 600 could be used in place of, and/or in combination with, one or more structures of the subpixel circuit 200 and/or the subpixel circuit 500. The subpixel circuit 600 could be implemented in the display panel 110. For example, the TFT layer comprising the plurality of subpixel circuits of the display panel 110 may comprise subpixel circuits like the subpixel circuit 600.

The subpixel circuit 600 can include the storage device 208, the drive transistor 216, the comparator 210, and the switch 218 of FIG. 2, and the second storage device 502 of FIG. 5. A voltage reference line 118 may provide a global voltage reference (e.g., Vref, which may be a constant value) which may be stored in the storage device 208. For example, the global voltage reference may be supplied by the display driver 104. The global voltage reference may enable a voltage setting that can persist in the subpixel circuit 600 through a plurality of frames. Further, the video data line 112 may provide a voltage data setting (e.g., Vdata) which may be stored in the second storage device 502. The voltage ramp data line 114 may connect to a first input of the comparator 210, and the second storage device 502, storing the voltage data setting, may connect to a second input of the comparator 210 than the subpixel circuit 200.

In operation, the subpixel circuit 600 can apply, via the storage device 208 and the drive transistor 216, the global voltage reference to control a current amplitude modulation supplied to the LED 202. Additionally, the subpixel circuit 600 can apply, via the second storage device 502, the comparator 210, and the switch 218, the voltage data setting and the voltage ramp setting to control a current pulse width modulation supplied to the LED 202. Supplying the global voltage reference, in addition to the voltage ramp setting and the voltage data setting, may enable the subpixel circuit 500 to control the LED 202 through a greater dynamic range than the subpixel circuit 200. Further, supplying the global voltage reference, as opposed to a second voltage data setting, may simplify wiring as compared to the subpixel circuit 500.

Figure 7:
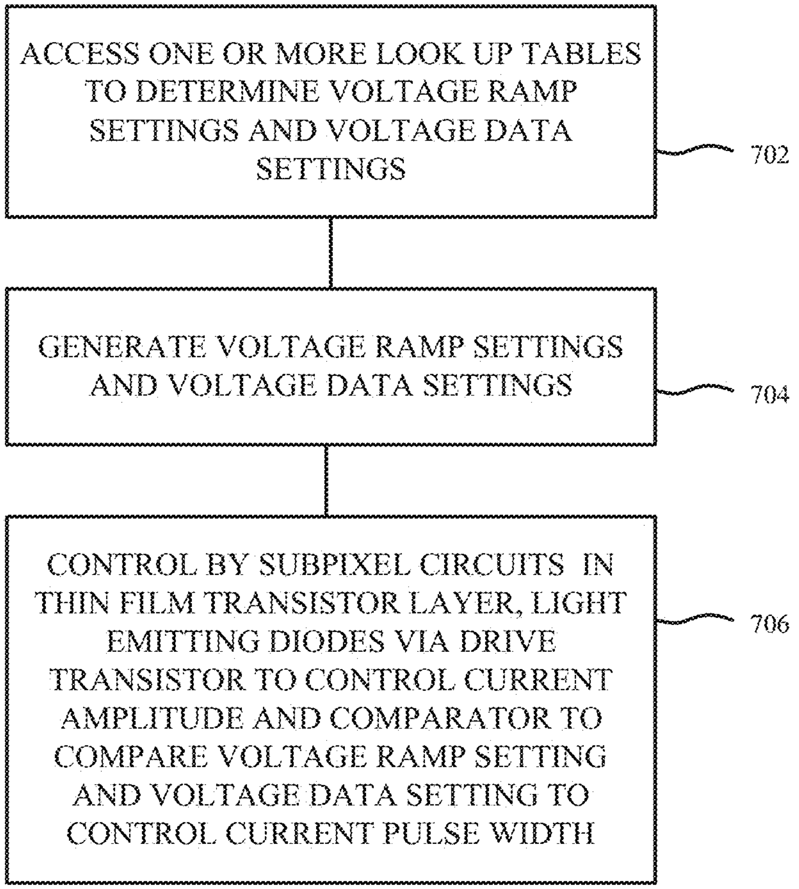
FIG. 7 is a flow chart for a method of driving a display panel based on a combination of pulse width modulation and amplitude modulation.

FIG. 7 is a flow chart for a method of driving a display panel based on a combination of pulse width modulation and amplitude modulation. At step 702, to configure brightness of a display panel (e.g., the display panel 110), a system may access one or more look up tables to determine voltage ramp settings and voltage data settings. For example, the display driver 104 may access the first look up table 122 to determine the voltage data settings and/or the second look up table 124 to determine a voltage ramp settings. In some implementations, the display driver 104 may access the one or more look up tables to determine second voltage data settings.

At step 704, the display driver 104 may generate the voltage ramp settings and the voltage data settings, which may be supplied to subpixel circuits (e.g., the subpixel circuit 200, the subpixel circuit 500, or the subpixel circuit 600). For example, the display driver 104 may utilize one or more digital to analog converters to convert values accessed from the one or more look up tables (e.g., gray level values, which could range from 0 to 255) to analog values for configuring the subpixel circuits with the voltage ramp settings and the voltage data settings. In some implementations, the display driver 104 may utilize one or more digital to analog converters to convert values accessed from the one or more look up tables to analog values for configuring the subpixel circuits with the second voltage data settings.

At step 706, subpixel circuits in the TFT layer may control a plurality of LEDs in the display panel 110 based on the voltage ramp settings and the voltage data settings. Each subpixel circuit may include a drive transistor to control a current amplitude to an LED and a comparator to compare a voltage ramp setting and a voltage data setting to control a current pulse width to the LED. As a result of the combination pulse width modulation and amplitude modulation, the subpixel circuits can improve control of light emitted by LEDs to provide a greater dynamic range/or a reduce power consumption.

Figure 8:
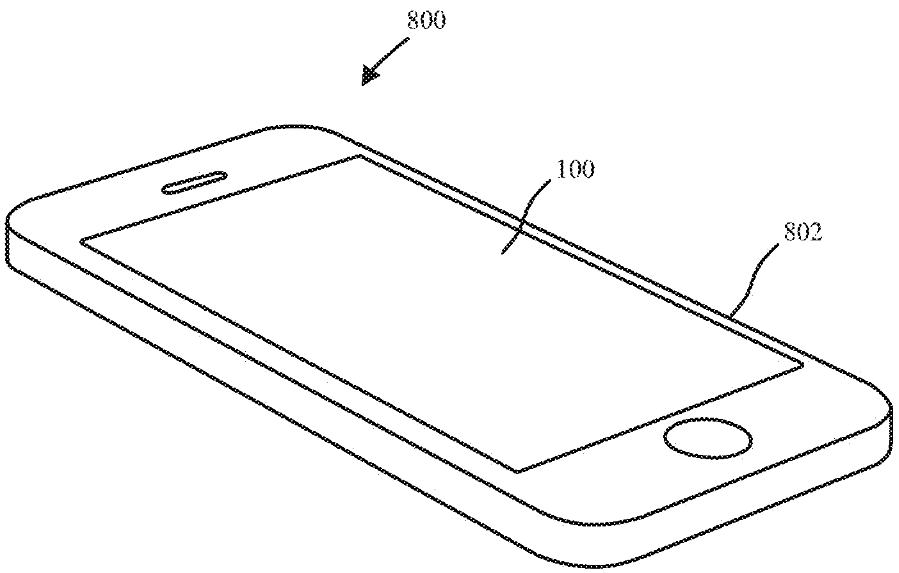
FIG. 8 is an isometric view of a mobile telephone in accordance with an embodiment.
Figure 9:
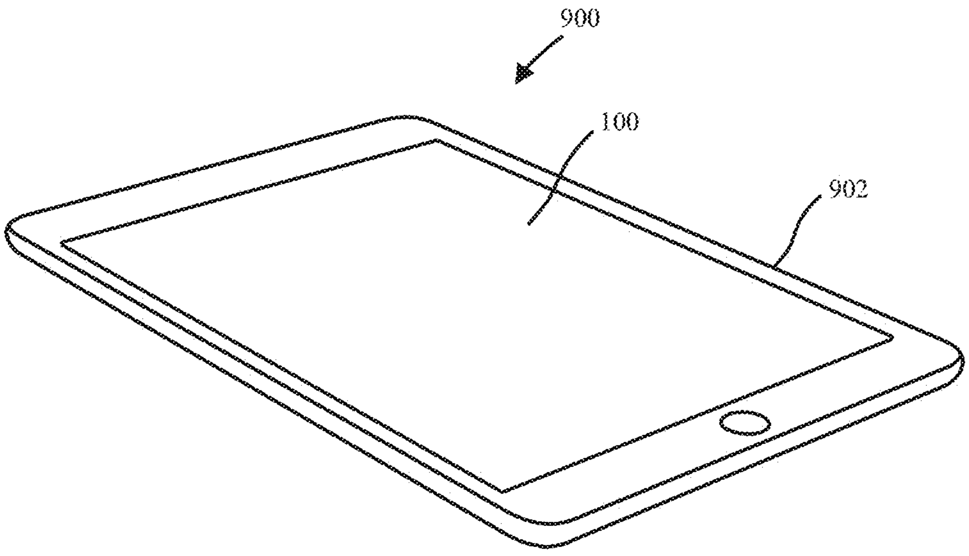
FIG. 9 is an isometric view of a tablet computing device in accordance with an embodiment.
Figure 10:
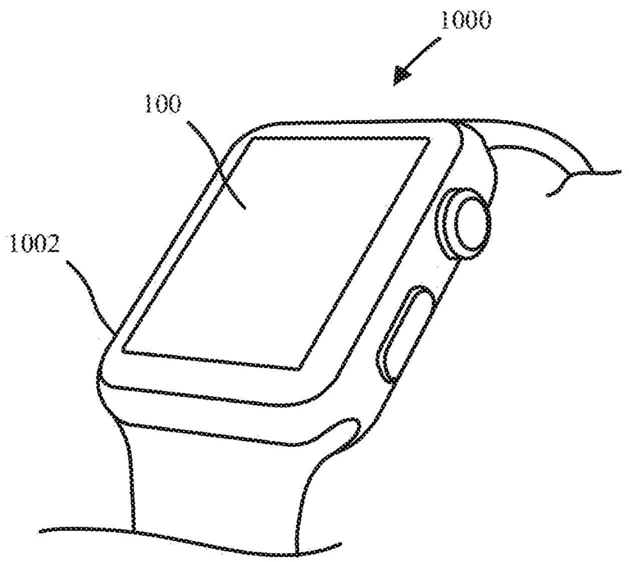
FIG. 10 is an isometric view of a wearable device in accordance with an embodiment.
Figure 11:
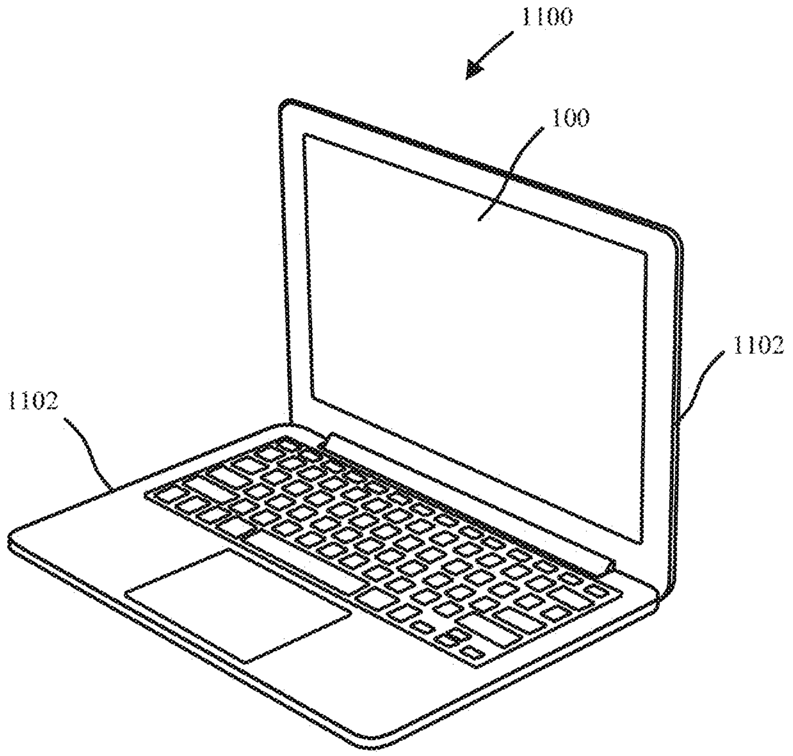
FIG. 11 is an isometric view of a laptop computer in accordance with an embodiment.

FIGS. 8-11 illustrate various portable electronic systems in which the various embodiments can be implemented, including a display panel 110 and subpixel circuits as described herein (e.g., the subpixel circuit 200, the subpixel circuit 500, or the subpixel circuit 600). FIG. 8 illustrates an exemplary mobile telephone 800 that includes a display system 100 packaged in housing 802. FIG. 9 illustrates an exemplary tablet computing device 900 that includes a display system 100 packaged in housing 902. FIG. 10 illustrates an exemplary wearable device 1000 that includes a display system 100 packaged in housing 1002. FIG. 11 illustrates an exemplary laptop computer 1100 that includes a display system 100 packaged in housing 1102.

Figure 12:
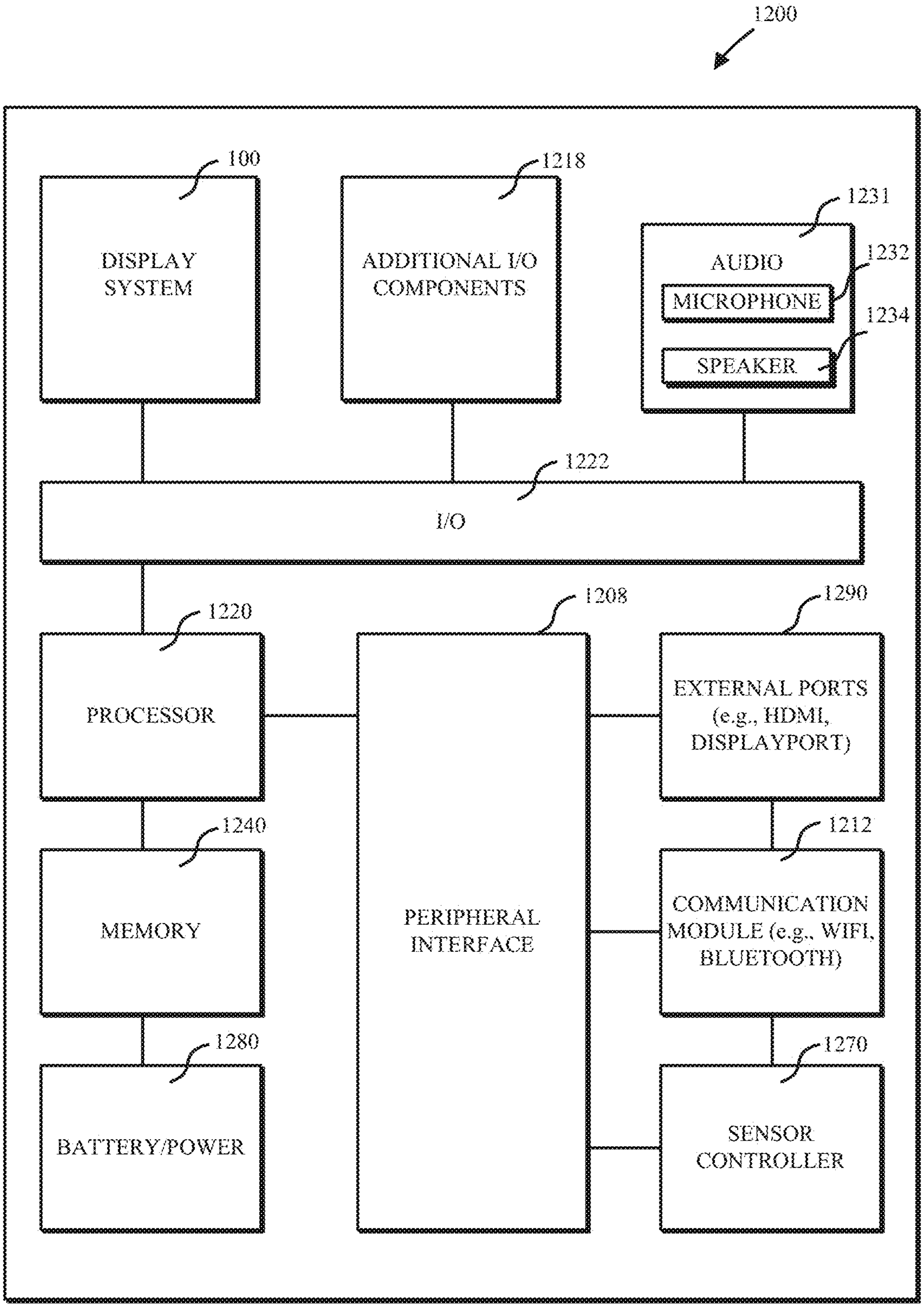
FIG. 12 is a system diagram of a portable electronic device in accordance with an embodiment.

FIG. 12 illustrates a system diagram for an embodiment of a portable electronic device 1200 including a display system 100 and subpixel circuits as described herein (e.g., the subpixel circuit 200, the subpixel circuit 500, or the subpixel circuit 600). The portable electronic device 1200 includes a processor 1220 and memory 1240 for managing the system and executing instructions. The memory includes non-volatile memory, such as flash memory, and can additionally include volatile memory, such as static or dynamic random-access memory (RAM). The memory 1240 can additionally include a portion dedicated to read only memory (ROM) to store firmware and configuration utilities.

The system also includes a power module 1280 (e.g., flexible batteries, wired or wireless charging circuits, etc.), a peripheral interface 1208, and one or more external ports 1290 (e.g., Universal Serial Bus (USB), HDMI, Display Port, and/or others). In one embodiment, the portable electronic device 1200 includes a communication module 1212 configured to interface with the one or more external ports 1290. For example, the communication module 1212 can include one or more transceivers functioning in accordance with IEEE standards, 3GPP standards, or other communication standards, and configured to receive and transmit data via the one or more external ports 1290. The communication module 1212 can additionally include one or more WWAN transceivers configured to communicate with a wide area network including one or more cellular towers, or base stations to communicatively connect the portable electronic device 1200 to additional devices or components. Further, the communication module 1212 can include one or more WLAN and/or WPAN transceivers configured to connect the portable electronic device 1200 to local area networks and/or personal area networks, such as a Bluetooth network.

The portable electronic device 1200 can further include a sensor controller 1270 to manage input from one or more sensors such as, for example, proximity sensors, ambient light sensors, or infrared transceivers. In some implementations, the system includes an audio module 1231 including one or more speakers 1234 for audio output and one or more microphones 1232 for receiving audio. In some implementations, the speaker 1234 and the microphone 1232 can be piezoelectric components. The portable electronic device 1200 further includes an input/output (I/O) controller 1222, the display system 100 (e.g., the display panel 110), and additional I/O components 1218 (e.g., keys, buttons, lights, LEDs, cursor control devices, haptic devices, and others). The display system 100 and the additional I/O components 1218 may be considered to form portions of a user interface (e.g., portions of the portable electronic device 1200 associated with presenting information to the user and/or receiving inputs from the user).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As used herein, the term "circuitry" refers to an arrangement of electronic components (e.g., transistors, resistors, capacitors, and/or inductors) that is structured to implement one or more functions. For example, a circuit may include one or more transistors interconnected to form logic gates that collectively implement a logical function.

In utilizing the various aspects of the embodiments, it would become apparent to one skilled in the art that combinations or variations of the above embodiments are possible for driving a display panel based on simultaneous pulse width modulation and amplitude modulation. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A display panel comprising:

a thin film transistor (TFT) layer comprising a plurality of subpixel circuits, each subpixel circuit including an amplitude modulator, comprising a drive transistor, that applies a voltage data setting, and a pulse width modulator, comprising a comparator, and a switch, that applies the voltage data setting and a voltage ramp setting, wherein the comparator compares the voltage data setting to the voltage ramp setting to generate an output to control the switch; and a plurality of light emitting diodes (LEDs) connected to the plurality of subpixel circuits, wherein each subpixel circuit of the plurality of subpixel circuits controls an LED of the plurality of LEDs based on a current amplitude controlled by the drive transistor and a current pulse width controlled by the comparator generating the output to the switch.

2. The display panel of claim 1, wherein each subpixel circuit receives the voltage ramp setting applied to a first input of the comparator, and the voltage data setting applied to a second input of the comparator, to control the current pulse width via the switch.

3. The display panel of claim 1, wherein each subpixel circuit includes a storage device connected to the drive transistor and the comparator to store the voltage data setting.

4. The display panel of claim 1, wherein the voltage data setting is applied to a gate of the drive transistor to control the current amplitude.

5. The display panel of claim 1, wherein each subpixel circuit receives the voltage data setting applied to a gate of the drive transistor to control the current amplitude.

6. The display panel of claim 1, wherein each subpixel circuit receives the voltage ramp setting that is constant between frames and the voltage data setting that changes to modulate the current pulse width.

7. The display panel of claim 1, wherein the plurality of subpixel circuits receives a global voltage ramp setting utilized by each subpixel circuit to control the current pulse width.

8. The display panel of claim 1, wherein the plurality of subpixel circuits includes a first row of subpixel circuits that receives a first voltage ramp setting and a second row of subpixel circuits that receives a second voltage ramp setting, the first voltage ramp setting utilized by the first row of subpixel circuits to control the current pulse width, and the second voltage ramp setting utilized by the second row of subpixel circuits to control the current pulse width.

9. The display panel of claim 1, wherein the drive transistor is connected to a power supply to control the current amplitude.

10. The display panel of claim 1, wherein the drive transistor is connected in series with the switch.

11. The display panel of claim 1, wherein an output of the comparator is connected to a gate of the switch.

12. The display panel of claim 1, wherein the plurality of LEDs is a plurality of micro-LEDs.

13. A method of display, comprising:

generating a voltage ramp setting and a voltage data setting; and controlling, by a subpixel circuit of a plurality of subpixel circuits in a thin film transistor (TFT) layer, a light emitting diode (LED) of a plurality of LEDs, wherein the subpixel circuit includes an amplitude modulator, comprising a drive transistor, that applies a voltage data setting to control a current amplitude to the LED and a pulse width modulator, comprising a comparator to compare the voltage ramp setting and the voltage data setting to generate an output to control a switch, to control a current pulse width to the LED.

14. The method of display of claim 13, further comprising:

accessing one or more look up tables to determine the voltage ramp setting and the voltage data setting.

15. The method of display of claim 13, wherein controlling the LED includes simultaneously controlling the current amplitude and the current pulse width.

16. The method of display of claim 13, wherein the voltage ramp setting is a global voltage ramp setting utilized by the plurality of subpixel circuits.

17. The method of display of claim 13, wherein the voltage ramp setting is a first voltage ramp setting of a plurality of voltage ramp settings utilized by a row of the plurality of subpixel circuits.

18. The method of display of claim 13, wherein the plurality of LEDs is a plurality of micro-LEDs.

* * * * *